Feb. 11, 1930.                    H. G. ZOIA                         1,746,847
                                SERVICE DEVICE
                             Filed Feb. 2, 1928              2 Sheets-Sheet 1
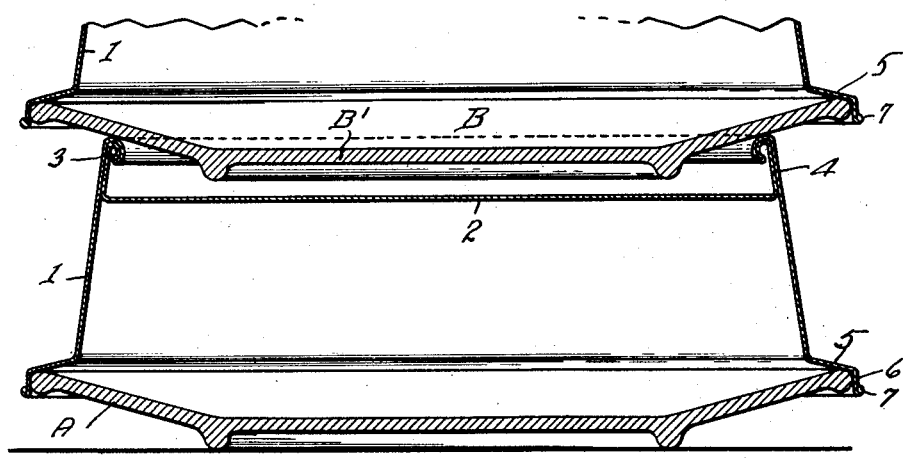
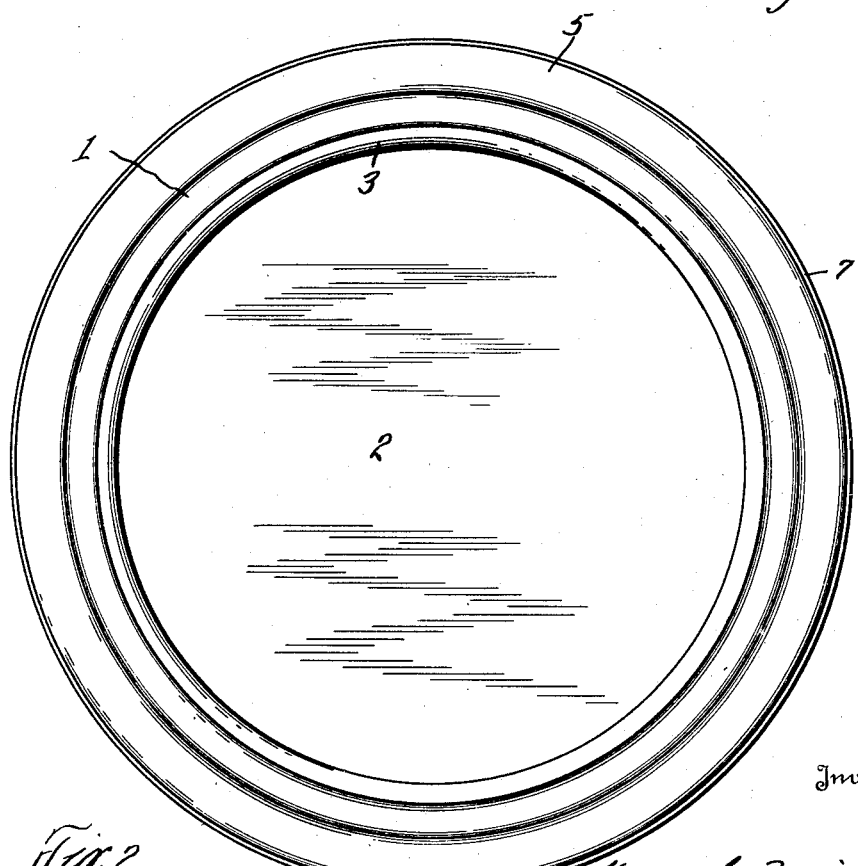

Patented Feb. 11, 1930

1,746,847

UNITED STATES PATENT OFFICE

HECTOR G. ZOIA, OF CLEVELAND, OHIO

SERVICE DEVICE

Application filed February 2, 1928. Serial No. 251,293.

This invention relates to devices for maintaining the temperature of foods and for serving the latter, and is particularly adapted for use in hotels, restaurants, and other places where a number of dishes, containing food, are stacked in a warm or a cold compartment (according to the nature of the food to be served) and where a number of such dishes, correspondingly stacked, are carried at the same time by waiters for service to patrons. The present device is an improvement upon a device for the same general purpose and object shown in my U. S. Patent No. 1,330,568 issued February 10, 1920.

An object of the present invention is to provide an improved and simplified construction of food-surrounding dish-spacing shell which will serve, not only to retain the temperature within the food served thereby while preventing dislodgment of the dishes engaged by the top and bottom thereof under ordinary conditions of service, but which will retain in each such shell the vapors emanating from the food therein while preventing contact of the food with the dish supported thereabove as well as with the fingers of the operator in removing a shell from the dish therebelow. A further object of the invention is to provide a construction in which these results may be accomplished in an efficient manner and with economy of production.

Figure 3:
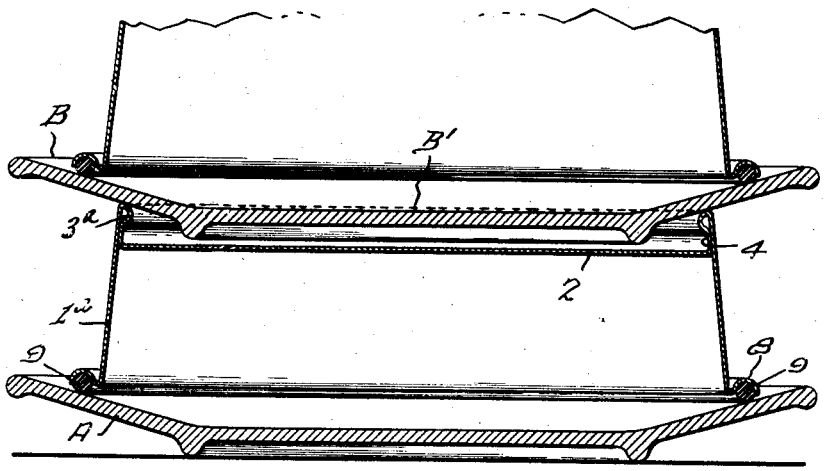

I accomplish the foregoing objects in and through the construction and arrangement of parts shown in the drawings forming a part hereof, wherein Fig. 1 represents a central vertical sectional view through a service shell and the lower portion of a like shell embodying my invention, showing in section the dishes to which the said shells are applied; Fig. 2 is a plan view of one of the shells shown in the preceding view; Fig. 3 a view, similar to Fig. 1, showing a modified form of shell, and Fig. 4 a central vertical sectional view through a still further modified form of shell.

Describing the various parts by reference characters, and with particular attention to the form of my invention shown in Figs. 1 and 2, the dish-spacing and food-surrounding shell comprises a frusto-conical side wall 1 of appropriate depth or height to provide therewithin and beneath the cover 2 a space sufficient for the retention of the food which is carried by the lower plate or dish A, while its upper end supports the upper plate or dish B.

The shell 1 is preferably made of sheet metal, aluminum being preferred at present on account of its lightness. The shell comprises a frusto-conical side wall the top 2 whereof is depressed, providing a double wall of metal extending above such top. The upper edge of this double wall is rolled inwardly, as shown at 3, to provide a bead. From such bead, the short wall 4 extends downwardly within and preferably fits closely against the inner face of the corresponding part of the wall 1. The bottom of the frusto-conical wall 4 merges with the cover 2, which is downwardly inset from the bead 3.

From the bottom of the shell 1 there projects a flange 5, said flange in turn carrying a depending flange 6 which is adapted to engage the outer edge of a plate or dish A of appropriate size, or to engage the edge of a smaller plate upon displacement of the latter with respect to the shell thereabove. The flange 6 is provided at its bottom with an outwardly turned bead 7 which is adapted to engage the outer edge portion of a plate or dish of larger diameter than said flange.

In use, the food-containing dishes A and B, with the interposed shells, may be stacked in an oven or refrigerator, according to the nature of the food to be served. The dishes and shells may be removed and carried in stacked condition, the beads 3 of the shells serving to engage the bottoms of the plates respectively thereabove and the flanges 6 engaging the outer edges of the plates respectively therebelow. Any shock tending to dislodge the plates A and B laterally will be resisted by the bottoms B' of the plates B and by the depending flange 6 engaging the edges of any plate A which may be therewithin.

The cover 2 prevents the food within the shell 1 from coming in contact with the dish thereabove and also positively prevents the escape of any vapors or moisture which may be condensed below the plate B above such shell. Furthermore, the inturned bead 3 provides a convenient means whereby the shell may be gripped by the waiter and removed from the plate therebelow, the downwardly inset cover 2 preventing the fingers of the waiter from coming in contact with the food.

The rings 1 may be made at comparatively low cost and are capable of being quickly and efficiently cleaned by reason of the absence of any additional plate-engaging rings of an absorbent character. Furthermore, the shape of the rings enables them to be nested, when not in use, thus economizing in storage space.

In Fig. 3 there is shown a modification of my invention wherein the plates A and B are as shown in the preceding views, but the upper end of the shell 1ª is so shaped as to provide a hollow single-walled bead 3ª, the parts 2 and 4 being substantially the same as in the preceding modification. In this case, the lower end of each shell is provided with an outwardly extending and upwardly convex flange 8 having fastened therein a ring 9, which may be of rubber or any other material serving to form a seal with the outer portion of the plate A therebelow.

Figure 4:
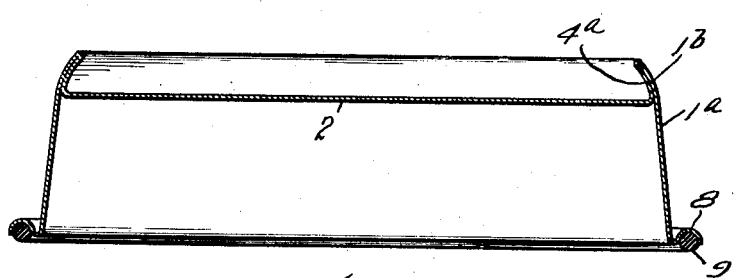

In Fig. 4 there is shown a still further modification wherein the parts 1ª, 2, 8 and 9 are as shown in the preceding view. In this case, however, the upper end of the shell 1ª is merely projected inwardly, as shown at 1ᵇ, the metal at such end being doubled upon itself, providing an inner wall 4ª adapted to engage the wall 1ᵇ, the parts 1ᵇ and 4ª forming at the top a seat for the bottom of a plate B and providing an annular inwardly projecting gripping portion which may be engaged by the fingers of the operator and which will permit him to remove the shell conveniently from a dish therebelow while preventing his fingers from engaging the food on such dish.

Having thus described my invention, what I claim is:

1. A combined service device and dish holder comprising an annular shell having its upper end shaped to provide a bead adapted to engage the bottom of an upper dish or plate and having its bottom formed to engage the outer portion of a lower dish or plate, the said shell having below such upper end a cover serving to prevent contact of a plate or dish thereabove with the food therebelow while enabling the holder to be grasped by the portion within and extending above said cover.

2. A combined service device and dish holder comprising an annular metal shell having its upper end bent upon itself to provide inner and outer walls, the inner wall extending below such end and having formed therewith a cover extending across the said shell below the top thereof, the bottom of the shell having means adapted to engage a plate or dish therebeneath whereby the shell is supported by such lower dish or plate.

3. A combined service device and dish holder comprising an annular shell having its upper end projected inwardly and bent upon itself to provide an inwardly projecting bead of doubled metal with an inner wall extending below the top of such portion and having formed therewith a cover extending across the said shell and below the top thereof, the bottom of the shell having means adapted to engage a plate or dish therebeneath whereby the shell is supported by such lower dish or plate.

4. A combined service device and dish holder comprising an annular shell having its upper end bent upon itself to provide an inwardly directed bead with an inner wall extending below said bead and provided with a cover at its bottom which cover is spaced from and below the said bead, said shell having a bottom formed to rest upon a dish or plate therebelow.

5. A combined service device and dish holder comprising an annular shell having its upper end projected inwardly and bent upon itself to provide outer and inner walls at such end, the inner wall extending below such end and having at its bottom a cover spaced from and below such end, said shell having a bottom formed to rest upon a dish or plate therebelow.

6. A combined service device and dish holder comprising an annular metal shell bent upon itself at its upper end to provide a double-walled dish-engaging portion for the bottom of a dish or plate thereabove, the inner wall having below the top of said shell a cover extending across the said shell and below the top thereof and the lower end of the said shell being formed to engage and rest upon a dish or plate therebelow.

7. A combination service device and dish holder of the character described comprising an annular shell the lower peripheral portion of which is shaped to engage the periphery of a dish or plate, the upper portion of said shell being shaped to provide an annular upstanding bead and a depressed substantially flat cover, the said upstanding bead and lower peripheral portion of said shell being adapted to engage the outer and inner surfaces of superimposed and subjacent dishes respectively.

8. A combination service device and dish holder of the character described comprising an annular shell the lower peripheral portion of which is shaped to engage the periphery of a dish or plate, the upper portion of said shell being shaped to provide an annular upstanding bead and a depressed substantially flat cover, the said upstanding bead and lower peripheral portion of said shell being adapted to engage the outer and inner surfaces of superimposed and subjacent dishes respectively, and a friction ring secured to the lower peripheral portion of said shell.

9. A combination service device and dish holder comprising an annular one piece shell, the lower peripheral portion of which is shaped to engage the periphery of a dish or plate and the upper portion of which is bent upon itself to form an annular upstanding bead or collar and a cover which is spaced from said bead or collar and adapted to support a dish or plate thereon for the purpose set forth.

10. A combination service device and dish holder comprising an annular one piece shell, the lower peripheral portion of which is shaped to engage the periphery of a dish or plate and the upper portion of which is bent upon itself to form an annular upstanding bead or collar and a cover which is spaced from said bead or collar and adapted to support a dish or plate thereon for the purpose set forth, and an annular friction member carried by said lower peripheral portion.

11. A combination service device and dish holder comprising an annular shell having its upper end portion projected inwardly and bent upon itself to provide a bead and having a cover extending across said shell, the bottom of said shell having its lower peripheral portion shaped to engage the periphery of a dish or plate whereby the shell may be supported by such dish or plate.

12. A combination service device and dish holder comprising an annular shell having its upper end portion projected inwardly and bent upon itself to provide a bead and having a cover extending across said shell, the bottom of said shell having its lower peripheral portion shaped to engage the periphery of a dish or plate whereby the shell may be supported by such dish or plate, and a friction ring carried by the peripheral portion of said shell.

In testimony whereof, I hereunto affix my signature.

HECTOR G. ZOIA.